United States Patent
Panetti et al.

(10) Patent No.: US 11,407,532 B2
(45) Date of Patent: Aug. 9, 2022

(54) INNOVATIVE SYSTEM FOR DEPLOYING SATELLITES FROM LAUNCH VEHICLES

(71) Applicant: Thales Alenia Space Italia S.p.A. Con Unico Socio, Rome (IT)

(72) Inventors: Aniceto Panetti, Rome (IT); Massimiliano Marcozzi, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 146 days.

(21) Appl. No.: 16/640,678

(22) PCT Filed: Aug. 23, 2018

(86) PCT No.: PCT/IB2018/056390
§ 371 (c)(1),
(2) Date: Feb. 20, 2020

(87) PCT Pub. No.: WO2019/038708
PCT Pub. Date: Feb. 28, 2019

(65) Prior Publication Data
US 2020/0354090 A1 Nov. 12, 2020

(30) Foreign Application Priority Data
Aug. 23, 2017 (IT) .................. 102017000095557

(51) Int. Cl.
*B64G 1/64* (2006.01)
(52) U.S. Cl.
CPC ........ *B64G 1/641* (2013.01); *B64G 2001/643* (2013.01)

(58) Field of Classification Search
CPC ........ B64G 1/641; B64G 1/1085; B64G 1/10; B64G 1/66; B64G 2001/643; F42B 12/60; F42B 15/08; F42B 12/62
See application file for complete search history.

(56) References Cited

U.S. PATENT DOCUMENTS

| | | | |
|---|---|---|---|
| 3,712,229 A | 1/1973 | Schock | |
| 4,676,167 A * | 6/1987 | Huber, Jr. | F41B 3/04 102/393 |
| 5,613,653 A * | 3/1997 | Bombled | B64G 1/641 244/173.1 |
| 5,884,866 A | 3/1999 | Steinmeyer et al. | |

(Continued)

OTHER PUBLICATIONS

PCT International Search Report and Written Opinion for PCT/IB2018/056390 dated Oct. 30, 2018.

*Primary Examiner* — Medhat Badawi
*Assistant Examiner* — Vicente Rodriguez
(74) *Attorney, Agent, or Firm* — McCarter & English, LLP

(57) ABSTRACT

The invention concerns a satellite deployment system (30) for launch vehicles. Said satellite deployment system (30) comprises an outer dispenser (31) that is fitted, externally, with first releasable attachment means for releasably attaching first satellites (81) to said outer dispenser (31) and, internally, with an internal housing volume (310). Moreover, the satellite deployment system (30) further comprises at least an inner dispenser (32,33) that is externally fitted with second releasable attachment means for releasably attaching second satellites (82,83) to said inner dispenser (32,33), and that is accommodated in the internal housing volume (310) of the outer dispenser (31).

11 Claims, 3 Drawing Sheets

(56) References Cited

U.S. PATENT DOCUMENTS

| | | | |
|---|---|---|---|
| 6,296,206 B1 | 10/2001 | Chamness et al. | |
| 6,672,220 B2 * | 1/2004 | Brooks | F42B 12/60 |
| | | | 102/357 |
| 6,874,425 B1 * | 4/2005 | Doughty | F42B 12/62 |
| | | | 102/357 |
| 8,939,409 B2 | 1/2015 | Apland et al. | |
| 10,407,190 B2 | 9/2019 | Fernandez et al. | |
| 10,538,347 B1 * | 1/2020 | Turner | B64G 1/10 |
| 2009/0108139 A1 * | 4/2009 | Duden | B64G 1/641 |
| | | | 244/173.3 |
| 2014/0131521 A1 * | 5/2014 | Apland | B64G 1/641 |
| | | | 244/173.3 |

* cited by examiner

INNOVATIVE SYSTEM FOR DEPLOYING SATELLITES FROM LAUNCH VEHICLES

CROSS-REFERENCE TO RELATED APPLICATIONS

This application is a 35 U.S.C. § 371 National Stage filing of International Application No. PCT/IB2018/056390, filed on Aug. 23, 2018, which claims priority to Italian Patent Application 102017000095557, filed on Aug. 23, 2017.

TECHNICAL FIELD OF THE INVENTION

The present invention relates, in general, to the technical sector of systems for deploying spacecraft/satellites in orbit from launch vehicles and, more particularly, to an innovative system for deploying an extremely high number of satellites of various size/mass from a single launch vehicle.

STATE OF THE ART

As broadly known, launch vehicles (also simply known as launchers) are used to deploy spacecraft/satellites in a predetermined orbit around the Earth. To this end, one or more systems for deploying one or more spacecraft and/or one or more satellites are typically used, each of which is generally configured to:
  during launch, securely and strongly hold down one or more spacecraft and/or one or more satellites stowed in an available volume of a launcher; and,
  when the launcher reaches a predefined position in orbit, deploy (i.e., release) the spacecraft/satellite(s) in response to a control signal.

Some of the satellite deployment systems currently known are generally called dispensers.

For example, U.S. Pat. No. 5,884,866 A discloses a dispenser connectable to a launch vehicle in order to deploy a plurality of satellites in orbit. In particular, the dispenser according to U.S. Pat. No. 5,884,866 A, during a launch, is housed within a payload fairing (also simply known as fairing, or even nose cone) of a launch vehicle, and includes a post having a longitudinal axis, a connection assembly for coupling the post to the launch vehicle, and a plurality of fittings coupled to the post and having attachment means for deployably coupling a satellite to the post. The attachment means is aligned substantially orthogonal to the longitudinal axis of the post and defines attachment bays extending annularly about the post. After the launch, the payload fairing is jettisoned and then, in orbit, the satellites are deployed by the dispenser.

Another example of dispenser is provided in WO 2016/176302 A1, which discloses a satellite deployment system having a plurality, of releasable dispenser modules attached to each other, with each module carrying satellites. Each dispenser module acts as an individual final stage with its own propulsion unit and deploys a subset of satellites to the appropriate altitude and orbit.

Two further examples of dispenser are also provided in EP 3 081 496 A1 and EP 1 104 743 A2. In particular, EP 3 081 496 A1 discloses a dispenser designed to be externally fitted with a first layer of satellites by means of mechanical interfaces extending in a radial direction. Moreover, according to EP 3 081 496 A1, a second layer of satellites is arranged around the first layer of satellites thereby protruding therefrom, whereby said first layer is interposed between said second layer and the dispenser. Instead, EP 1 104 743 A2 discloses a cantilever, bi-level platform satellite dispenser for supporting a plurality of independently deployable satellites in a dual platform arrangement that includes a lower platform assembly and an upper platform assembly.

As is known, recent technological developments in the space/satellite sector have been leading to the feasibility of making smaller and smaller satellites (e.g., the so-called, minisatellites, microsatellites and nanosatellites), which are capable of performing an increasing number of functions, while manufacturing times and costs are reduced.

Small mass and size, low-cost satellites provide a series of technical and non-technical (e.g., economical/commercial) advantages with respect to traditional "larger" satellites and, hence, are becoming increasingly used for space missions, in particular for those having a limited mission budget, or for large satellite constellations, where the number of satellites requested in orbit can be in the order of hundreds or even thousands, requiring several launchers with associated high costs.

Additionally, the feasibility of manufacturing small mass and size, low-cost satellites is enabling the opening of the space/satellite market also to countries, institutions (e.g., universities), industries and companies traditionally excluded therefrom (e.g., for cost reasons).

Therefore, larger than ever satellite constellations have been planned and high capacity launch vehicles are being made available in the next future.

In this connection, US 2014/131521 A1 discloses a sort of dispenser-like structure for deploying small satellites. In particular, according to US 2014/131521 A1, a plurality of satellites can be arranged to be supported from exterior edges of a support cylindrical structure, while one or more satellites could be supported inside said support cylindrical structure.

Unfortunately, existing solutions for launching and deploying multiple satellites have proven to be unfit to meet the increasing demand for small satellite launch and deployment.

In particular, the existing satellite deployment systems (such as those of the dispenser type) can accommodate only a predetermined and limited number of satellites, and hence do not allow launch and deployment of a high number of small satellites by means of a single launch vehicle.

Moreover, the existing satellite deployment systems also have proven to lack the desired flexibility in accommodating satellites of different size/mass within one and the same launch vehicle.

Thus, in view of the foregoing, today in the space/satellite sector there is an increasingly felt need for satellite deployment technologies enabling deployment of a large number of satellites, preferably of various size/mass, from a single launch vehicle.

OBJECT AND SUMMARY OF THE INVENTION

A first object of the present invention is that of providing a satellite deployment technology (particularly efficient for small satellites) enabling deployment of a higher number of satellites from a single launch vehicle than the current satellite deployment solutions, in particular those of the dispenser type.

Moreover, a second object of the present invention is that of providing a satellite deployment technology enabling deployment of several satellites of various size/mass from a single launch vehicle.

These and other objects are achieved by the present invention in that it relates to a satellite deployment system for launch vehicles, as defined in the appended claims.

In particular, a satellite deployment system according to the present invention comprises:

an outer dispenser that is fitted,
externally, with first releasable attachment means for releasably attaching first satellites to said outer dispenser and,
internally, with an internal housing volume; and at least an inner dispenser that is
externally fitted with second releasable attachment means for releasably attaching second satellites to said inner dispenser and
accommodated in the internal housing volume of the outer dispenser.

Conveniently, the satellite deployment system is designed to be installed on board a launch vehicle in a fairing volume defined by a fairing payload of said launch vehicle.

Conveniently, the outer and inner dispensers are coaxial with each other, thereby having one and the same longitudinal axis.

Preferably, the outer and inner dispensers are coupled to each other by means of a telescopic mechanism operable to extract the inner dispenser from the internal housing volume of the outer dispenser. In this case, the satellite deployment system may be conveniently configured to:

operate the telescopic mechanism to extract the inner dispenser from the internal housing volume of the outer dispenser and, after the inner dispenser has been extracted from said internal housing volume, deploy the first and second satellites; or deploy the first satellites, then operate the telescopic mechanism to extract the inner dispenser from the internal housing volume of the outer dispenser and, lastly, deploy the second satellites.

Conveniently, the satellite deployment system includes a plurality of nested inner dispensers accommodated in the internal housing volume of the outer dispenser, wherein each inner dispenser is externally fitted with respective second releasable attachment means for releasably attaching respective second satellites to said inner dispenser.

Preferably, the outer dispenser and the nested inner dispensers are coupled to each other by means of a telescopic mechanism operable to extract all the nested inner dispensers from one another and from the internal housing volume of the outer dispenser. In this case, several different inner dispenser extraction strategies and several different satellite deployment strategies may be conveniently selected and used depending on specific mission requirements and constraints.

BRIEF DESCRIPTION OF THE DRAWINGS

For a better understanding of the present invention, preferred embodiments, which are intended purely by way of non-limiting examples, will now be described with reference to the attached drawings (all not to scale), where FIGS. 1-5 schematically illustrate a satellite deployment system according to an illustrative, non-limiting embodiment of the present invention.

DETAILED DESCRIPTION OF PREFERRED EMBODIMENTS OF THE INVENTION

Figure 1:
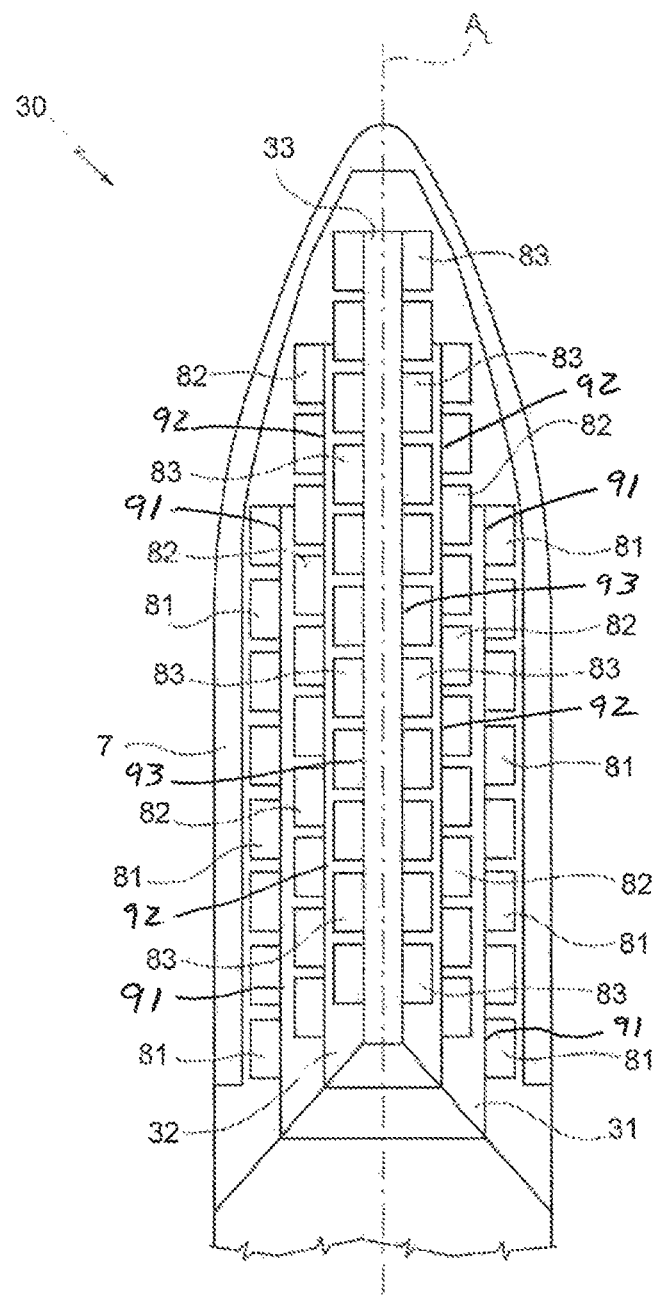

The following discussion is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope consistent with the principles and features disclosed herein and defined in the appended claims.

As previously explained, in the space/satellite sector there is an increasingly felt need for more efficient launch and deployment technologies capable of deploying a large number of small satellites (such as the so-called minisatellites, microsatellites and nanosatellites).

In this connection, the Applicant has noticed that the existing satellite deployment systems of the dispenser type inefficiently fill up a considerable part of the volume defined by the fairing of a launch vehicle, thereby limiting the maximum number of satellites that can be stowed in said volume and, hence, increasing launch cost and deployment time with the needs for additional launches.

To put the foregoing in a different perspective, the volume defined by the fairing of a launch vehicle (in the following simply called fairing volume) is exploited by the current dispensers not completely and inefficiently.

In particular, all known solutions envisage a dispenser structure, which the satellites are connected externally to, and which has an internal volume that is partially filled up with structural parts (e.g., booms, supports, etc.) of the dispenser and that is sometimes used to accommodate wirings, fittings, control units, etc.

For example, in the satellite deployment system according to WO 2016/176302 A1, the internal volume of each dispenser module is used to accommodate a dispenser module controller, a propulsion unit, an attitude control unit and related wirings, whereas in the dispenser-like structure according to US 2014/131521 A1 (at the utmost) only one or more additional satellites are accommodated in the internal volume of said dispenser-like structure.

More in general, the internal volume of the known dispensers is never used to accommodate additional dispensers.

On the contrary, the present invention stems from Applicant's idea of efficiently exploiting also the internal volume of a dispenser structure to accommodate one or more additional inner dispensers. This is feasible in view of the smaller and smaller mass and size of satellites manufactured nowadays and, even more so, of future satellites. In fact, an extremely reduced satellite size/mass, on the one hand, allows to accommodate more small satellites externally to a dispenser structure (as in the existing solutions), but, on the other hand, also allows to accommodate one or more inner dispensers with additional small satellites in a hollow internal volume of the dispenser structure (according to the idea underlying the present invention).

Thence, the present invention stems from Applicant's idea of using a hollow outer dispenser in which one or more inner dispensers are accommodated.

In particular, this idea leads to design an outer dispenser with an increased radius (instead of trying reducing it, as normally done in current, solutions) in order to obtain a sufficiently large internal housing volume to insert one or more additional inner dispensers that will fit secondary satellites.

The use of the internal volume of an outer dispenser to accommodate one or more inner dispensers with additional satellites allows, in general, to maximize volumetric exploitation of a launch vehicle and, more particularly, to optimally and efficiently exploit the whole volume defined by the fairing of a launch vehicle, thereby achieving maximum satellite accommodation in the fairing volume.

More in detail, a satellite deployment system according to the present invention is designed to be housed/accommodated/installed/arranged within a fairing (i.e., in a fairing volume) of a launch vehicle, and includes:

an outer dispenser and one or more inner dispensers; and, conveniently, also one or more assemblies for coupling/attaching/fastening the outer and inner dispenser(s) to the launch vehicle (conveniently, each dispenser may be coupled to the launch vehicle by means of a respective connection assembly, such as a bolted interface for fixed dispenser(s) (e.g., the outer dispenser), and a clamp-band interface or gyro bolt fittings for deployable dispenser(s)).

Each outer/inner dispenser is equipped with respective satellite releasable attachment means (for example, means based on the so-called Hold-Down and Release Mechanisms (HDRMs) of the explosive or non-explosive type; e.g., the so-called Non-Explosive Actuators (NEAs)) configured to:

releasably couple/attach/fasten a plurality of respective satellites to said outer/inner dispenser (in particular, externally thereto); and release from said outer/inner dispenser, and provide the initial mechanical impulse to, said respective satellites in response to a control signal.

Conveniently, for each outer/inner dispenser, the respective releasable attachment means (91, 92, 93) define respective attachment bays extending externally to, and around, said outer/inner dispenser, said respective releasable attachment means (91, 92, 93) being configured to releasably couple/attach/fasten the respective satellites to said outer/inner dispenser at said respective attachment bays.

The outer dispenser has (i.e., is provided/fitted with) an internal housing volume in which the inner dispenser(s) is/are arranged/housed/accommodated.

If the satellite deployment system includes two or more inner dispensers, the same housing mechanism can be advantageously exploited.

For example, the satellite deployment system may conveniently include:

a first inner dispenser and a second inner dispenser, wherein the first inner dispenser is arranged/housed/accommodated in the internal housing volume of the outer dispenser and, in turn, has (i.e., is provided/fitted with) a respective internal housing volume in which the second inner dispenser is arranged/housed/accommodated;

a first inner dispenser, a second inner dispenser and a third inner dispenser, wherein the first inner dispenser is arranged/housed/accommodated in the internal housing volume of the outer dispenser and, in turn, has (i.e., is provided/fitted with) a respective internal housing volume in which the second inner dispenser arranged/housed/accommodated, and the second inner dispenser, which is arranged/housed/accommodated in the internal housing volume of the first inner dispenser, in turn has (i.e., is provided/fitted with) a respective internal housing volume in which the third inner dispenser is arranged/housed/accommodated;

and so on.

More in general, the satellite deployment system may conveniently comprise a plurality of nested inner dispensers accommodated in the internal housing volume of the outer dispenser, wherein each inner dispenser is externally fitted with respective releasable attachment means for releasably attaching respective satellites to said inner dispenser.

Preferably, the outer and inner dispensers are coaxial with each other, thereby having (i.e., sharing) one and the same longitudinal axis. Conveniently, said longitudinal axis defines an axis of symmetry of said outer and inner dispensers. More conveniently, said outer and inner dispensers have, each, a respective rotational symmetry with respect to said longitudinal axis.

Preferably, the outer and inner dispensers are coupled to each other by means of a telescopic mechanism operable to extract all the nested inner dispensers from one another and from the internal housing volume of the outer dispenser.

In this case, several different inner dispenser extraction strategies and several different satellite deployment strategies may be conveniently selected and used depending on specific mission requirements and constraints For example, according to a first deployment strategy, the satellite deployment system may be conveniently configured to:

operate the telescopic mechanism to extract each inner dispenser; and, after the inner dispensers have been extracted, deploy all the satellites releasably attached to the outer and inner dispensers.

Alternatively, according to a second deployment strategy, the satellite deployment system may be conveniently configured to:

deploy the satellites releasably attached to the outer dispenser;

after which, for each inner dispenser (e.g., starting from the most external one up to the most internal one, or vice versa), operate the telescopic mechanism to extract said inner dispenser and then deploy the respective satellites releasably attached to said inner dispenser.

Otherwise, according to a different embodiment (that does not involve the telescopic mechanism and that implements a third deployment strategy), the satellite deployment system could be configured to:

deploy the satellites releasably attached to the outer dispenser and then jettison said outer dispenser;

after which, for each inner dispenser (in particular, starting from the most external one up to the most internal one), deploy the respective satellites releasably attached to said inner dispenser and then jettison said inner dispenser.

The outer and inner dispensers (and also their respective internal housing volumes) may have any convenient shape, for example a tubular/cylindrical shape (very efficient from structural point of view), or a truss shape (especially, the most internal dispenser) if convenient for satellite accommodation. In fact, those skilled in the art will appreciate that different geometries of the outer and inner dispensers may be advantageously used without departing from the scope of the present invention, as defined by the appended claims.

The outer dispenser is the primary structure; this means that it provides the big part of the stiffness and the strength to carry all the satellites including those attached to the inner dispenser(s).

In fact, experimental analyses carried out by the Applicant have shown that the larger the diameter of the outer dispenser, the larger the area moment of inertia and, hence, the larger the stiffness (at the minimum technological skin thickness). This means that, as previously explained, the outer dispenser conveniently provides the large part of the necessary stiffness to the overall assembly (i.e., all the dispensers including all the anchored satellites). It may be structurally convenient to install the outer and largest dispenser on a simple bolted interface.

In particular, the experimental analyses carried out by the Applicant have demonstrated that the overall mass of the dispensers and of the relevant mechanisms is, in most cases, conveniently within 15% of the total launch mass capability of a launch vehicle.

Conveniently, the inner dispenser (s) may be constrained to the outer dispenser (for example, by means of small wheels that guide and enable the extraction of the inner dispenser (s) and achieve a pinned joints type of support) to increase the structural lateral stiffness of the inner dispenser (s) that, due to the smaller area moment of inertia, has/have lower structural rigidity, conveniently reducing their mass and cost.

Conveniently, compliance with allowed height of the center of mass of a launch vehicle can be achieved by placing the heaviest satellites at the base of the dispensers.

For a better understanding of the present invention, FIGS. 1-5 schematically illustrate a satellite deployment system (denoted as a whole by 30) according to an illustrative, non-limiting embodiment of the present invention.

In particular, the satellite deployment system 30 is installed on board a launch vehicle (specifically, is arranged/accommodated in a fairing volume defined by a fairing 7 of a launch vehicle), and includes an outer dispenser 31, a first inner dispenser 32 and a second inner dispenser 33 (e.g., substantially tubular/cylindrical in shape), which are coaxial with each other thereby having one and the same longitudinal axis $A_L$ (that corresponds to the longitudinal axis of the launch vehicle and the fairing 7), wherein:

the outer dispenser 31 has a first internal housing volume 310;
first satellites 81 are releasably attached to said outer dispenser 31 (in particular, externally thereto);
the first inner dispenser 32 is accommodated in the first internal housing volume 310 of the outer dispenser 31, and has a second internal housing volume 320;
second satellites 82 are releasably attached to said first inner dispenser 32 (in particular, externally thereto);
the second inner dispenser 33 is accommodated in the second internal housing volume 320 of the first inner dispenser 32; and
third satellites 83 are releasably attached to said second inner dispenser 33 in particular, externally thereto).

Figure 2:
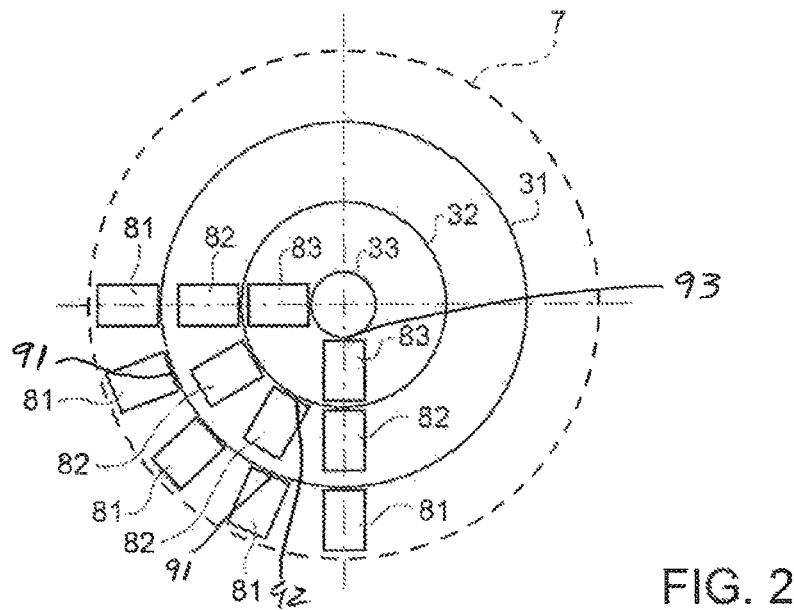

In detail, FIGS. 1, 3, 4 and 5 are schematic cross-sectional views of the satellite deployment system 30 on a plane containing the longitudinal axis $A_L$, while FIG. 2 is a schematic cross-sectional view of the satellite deployment system 30 on a plane perpendicular to the longitudinal axis $A_L$.

Figure 3:
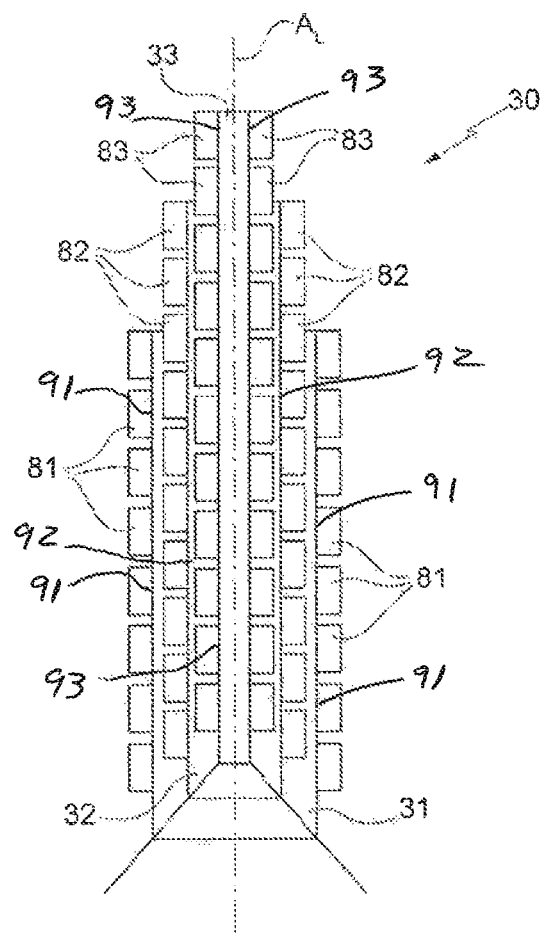
Figure 4:
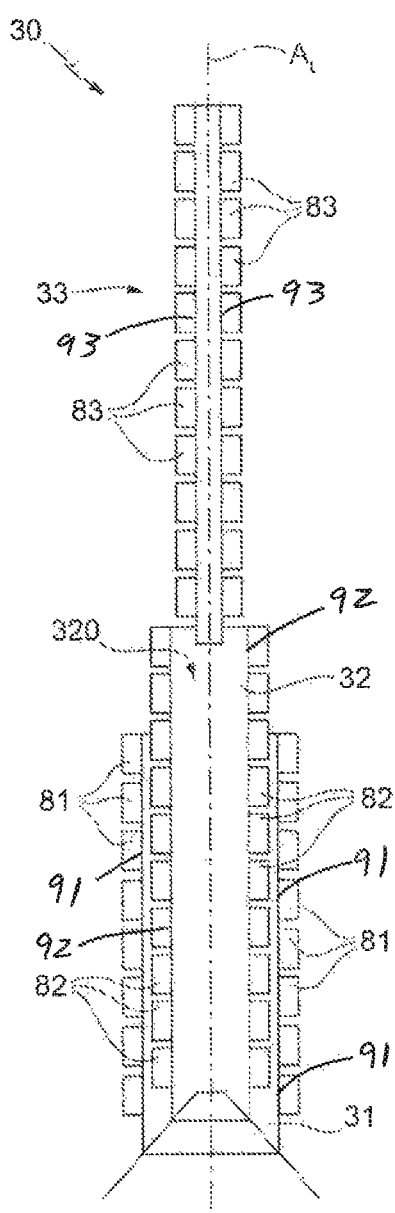

More in detail, FIG. 1 shows the satellite deployment system 30 accommodated in the fairing volume of the launch vehicle at launch; FIG. 2 shows arrangement of the first, second and third satellites 81, 82, 83 around the longitudinal axis $A_L$ at launch; FIG. 3 shows the satellite deployment system 30 after the fairing 7 (conveniently, a clamshell fairing) has been jettisoned; FIG. 4 shows the satellite deployment system 30 after the second inner dispenser 33 has been extracted from the second internal housing volume 320 of the first, inner dispenser 32; finally, FIG. 5 shows the satellite deployment system 30 after the first inner dispenser 32 has been extracted from the first internal housing volume 310 of the outer dispenser 31.

Figure 5:
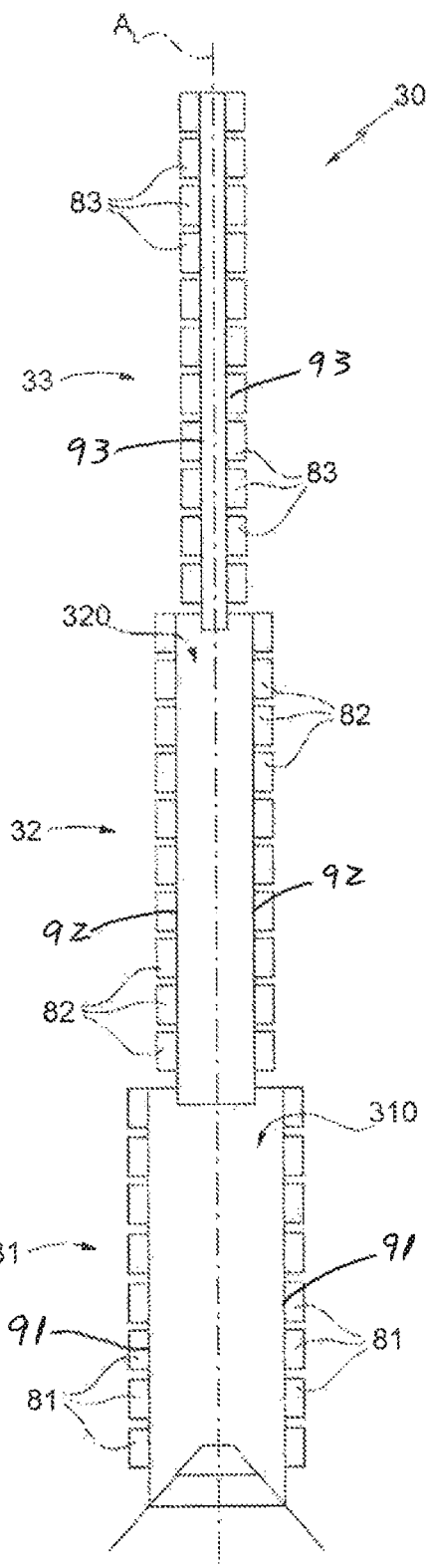

As shown in FIGS. 4 and 5, the first and second inner dispensers 32,33 are extracted from, respectively, the first and second internal housing volumes 310,320 along the longitudinal axis $A_L$ by means of a telescopic mechanism, so that said first and second inner dispensers 32,33 reach, each, a respective clear zone for satellite release.

Conveniently, the first and second inner dispensers 32,33 can be releasably coupled to the launch vehicle by means of a clamp-band interface, so that they can be separated from said launch vehicle in response to a control signal.

Again conveniently, the telescopic mechanism includes a driving/guiding system for extracting the first and second inner dispensers 32,33 from, respectively, the first and second internal housing volumes 310,320 along the longitudinal axis $A_L$. For example, the telescopic mechanism may include cantilevered wheels, that are mounted within the outer dispenser 31 providing a lateral constraint to the stowed first and second inner dispensers 32,33 and guide said first and second inner dispensers 32,33 during the extraction; and
a rope-motor system or direct-drive wheels for providing the necessary pull for the extraction of the first and second inner dispensers 32,33.

In order to carry out one of the aforesaid deployment strategy based on the use of a telescopic mechanism, the satellite deployment system 30 may be conveniently fitted with one or more control units configured to control the operation of said satellite deployment system 30 so as to cause the aforesaid telescopic-mechanism-based deployment operations to be carried out.

From the foregoing, the technical advantages of the present invention are immediately clear to those skilled in the art.

In particular, it is important to point out that the present invention allows to:

maximize exploitation of the mass-volume available on a launcher vehicle (specifically, maximize exploitation of the fairing volume of a launch vehicle) minimizing, at the same time, the mass of the structures and mechanisms for supporting satellites;
carry and deploy more satellites by means of a single launch vehicle than the existing satellite deployment solutions, thereby increasing economic saving and reducing the overall schedule, especially for large satellite constellations; and
deploy satellites of various size/mass from a single launch vehicle.

In conclusion, it is clear that numerous modifications and variants can be made to the present invention, all falling within the scope of the invention, as defined in the appended claims.

The invention claimed is:

1. Satellite deployment system (30) for launch vehicles, comprising an outer dispenser (31) that is fitted:
externally, with first releasable attachment means for releasably attaching first satellites (81) to said outer dispenser (31); and,
internally, with an internal housing volume (310);
further comprising an inner dispenser (32,33) that is positioned within the internal housing volume (310) of the outer dispenser (31), movably coupled relative to the outer dispenser (31), and externally fitted with second releasable attachment means for releasably attaching second satellites (82,83) to said inner dispenser (32,33).

2. The satellite deployment system of claim 1, configured and dimensioned for installation on board a launch vehicle in a fairing volume defined by a fairing payload (7) of said launch vehicle.

3. The satellite deployment system according to claim 1, wherein the outer and inner dispensers (31, 32, 33) are coaxial with each other, thereby having one and the same longitudinal axis ($A_L$).

4. The satellite deployment system according to claim 1, wherein the outer and inner dispensers (31, 32, 33) are coupled to each other by means of a telescopic mechanism operable to extract the inner dispenser (32,33) from the internal housing volume (310) of the outer dispenser (31).

5. The satellite deployment system of claim 4, configured to:
   operate the telescopic mechanism to extract the inner dispenser (32,33) from the internal housing volume (310) of the outer dispenser (31); and,
   after the inner dispenser (32,33) has been extracted from the internal housing volume (110) of the outer dispenser (31), deploy the first and second satellites (81, 82, 83).

6. The satellite deployment system of claim 4, configured to:
   deploy the first satellites (81);
   after the first satellites (81) have been deployed, operate the telescopic mechanism to extract the inner dispenser (32,33) from the internal housing volume (310) of the outer dispenser (31); and,
   after the inner dispenser (32,33) has been extracted from the internal housing volume (310) of the outer dispenser (31), deploy the second satellites (82,83).

7. The satellite deployment system according to claim 1, comprising a plurality of nested inner dispensers (32,33) accommodated in the internal housing volume of the outer dispenser (31), wherein each inner dispenser (32,33) is externally fitted with respective second releasable attachment means for releasably attaching respective second satellites (82,83) to said inner dispenser (32,33).

8. The satellite deployment system of claim 7, wherein the outer dispenser (31) and the nested inner dispensers (32,33) are coupled to each other by means of a telescopic mechanism operable to extract all the nested inner dispensers (32,33) from one another and from the internal housing volume (310) of the outer dispenser (31).

9. The satellite deployment system of claim 8, wherein the outer dispenser (31) and the nested inner dispensers (32,33) are constrained to each other.

10. Launch vehicle equipped with the satellite deployment system (30) as claimed in claim 1.

11. The launch vehicle of claim 10, comprising a fairing payload (7) defining a fairing volume in which said satellite deployment system (30) is accommodated.

* * * * *